(12) United States Patent
Meints et al.

(10) Patent No.: US 9,903,505 B2
(45) Date of Patent: Feb. 27, 2018

(54) REMOTE OPERATED VALVES FOR ISO CONTAINERS

(71) Applicant: Hoover Materials Handling Group, Inc., Houston, TX (US)

(72) Inventors: Scott T. Meints, Katy, TX (US); Michael Dean Hartley, Beatrice, NE (US)

(73) Assignee: Hoover Materials Handling Group, Inc., South Houston, TX (US)

( * ) Notice: Subject to any disclaimer, the term of this patent is extended or adjusted under 35 U.S.C. 154(b) by 71 days.

(21) Appl. No.: 15/172,934

(22) Filed: Jun. 3, 2016

(65) Prior Publication Data

US 2017/0350532 A1 Dec. 7, 2017

(51) Int. Cl.
*F16K 31/46* (2006.01)
*B67D 7/32* (2010.01)

(52) U.S. Cl.
CPC .......... *F16K 31/465* (2013.01); *B67D 7/3227* (2013.01); *F17C 2205/0329* (2013.01); *F17C 2205/0332* (2013.01); *Y10T 137/8634* (2015.04); *Y10T 137/86324* (2015.04)

(58) Field of Classification Search
CPC ......... Y10T 137/3034; Y10T 137/3024; Y10T 137/6866; Y10T 137/86324; Y10T 137/86332; Y10T 137/8634; Y10T 137/86276; F16K 31/465; F17C 2205/0329; F17C 2205/0332; F17C 2205/0335; B67D 7/3227
USPC ........................... 251/294; 141/201; 137/587
See application file for complete search history.

(56) References Cited

U.S. PATENT DOCUMENTS

| 4,109,677 A * | 8/1978 | Burnside ................. B60P 3/224 137/586 |
| 4,907,676 A * | 3/1990 | Shirdavani ......... F01M 11/0408 184/1.5 |
| 5,533,648 A * | 7/1996 | Read .................... A01K 5/0216 119/56.1 |
| 5,566,712 A * | 10/1996 | White ....................... B61C 5/00 137/587 |
| 6,253,801 B1 * | 7/2001 | Lie .......................... B67D 7/72 137/571 |

(Continued)

*Primary Examiner* — Matthew W Jellett
(74) *Attorney, Agent, or Firm* — Wood, Phillips, Katz, Clark & Mortimer

(57) ABSTRACT

A tank container for bulk storage of liquid materials is provided with with remote operated valves. The tank container comprises a storage vessel for bulk storage of liquid materials and having a height of about eight feet. The storage vessel includes an outlet valve proximate a bottom of the vessel, a fill valve at a top of the vessel, and a vent valve at the top of the vessel. A parallelepiped frame surrounds and is secured to the storage vessel for stacking and transporting of the tank container. A fill line includes an outlet connected to the fill valve and extending downwardly within the frame and an inlet proximate the bottom of the frame. A fill valve actuator is mounted proximate the bottom of the storage vessel mechanically linked with the fill valve for operating the fill valve remote from the top of the storage vessel. A vent valve actuator is mounted proximate the bottom of the storage vessel mechanically linked with the vent valve for operating the vent valve remote from the top of the storage vessel.

20 Claims, 3 Drawing Sheets

(56) References Cited

U.S. PATENT DOCUMENTS

2009/0294486 A1* 12/2009 McKnight .............. B65D 88/12
 222/482
2010/0258201 A1* 10/2010 Platusich .................. F16T 1/14
 137/178

* cited by examiner

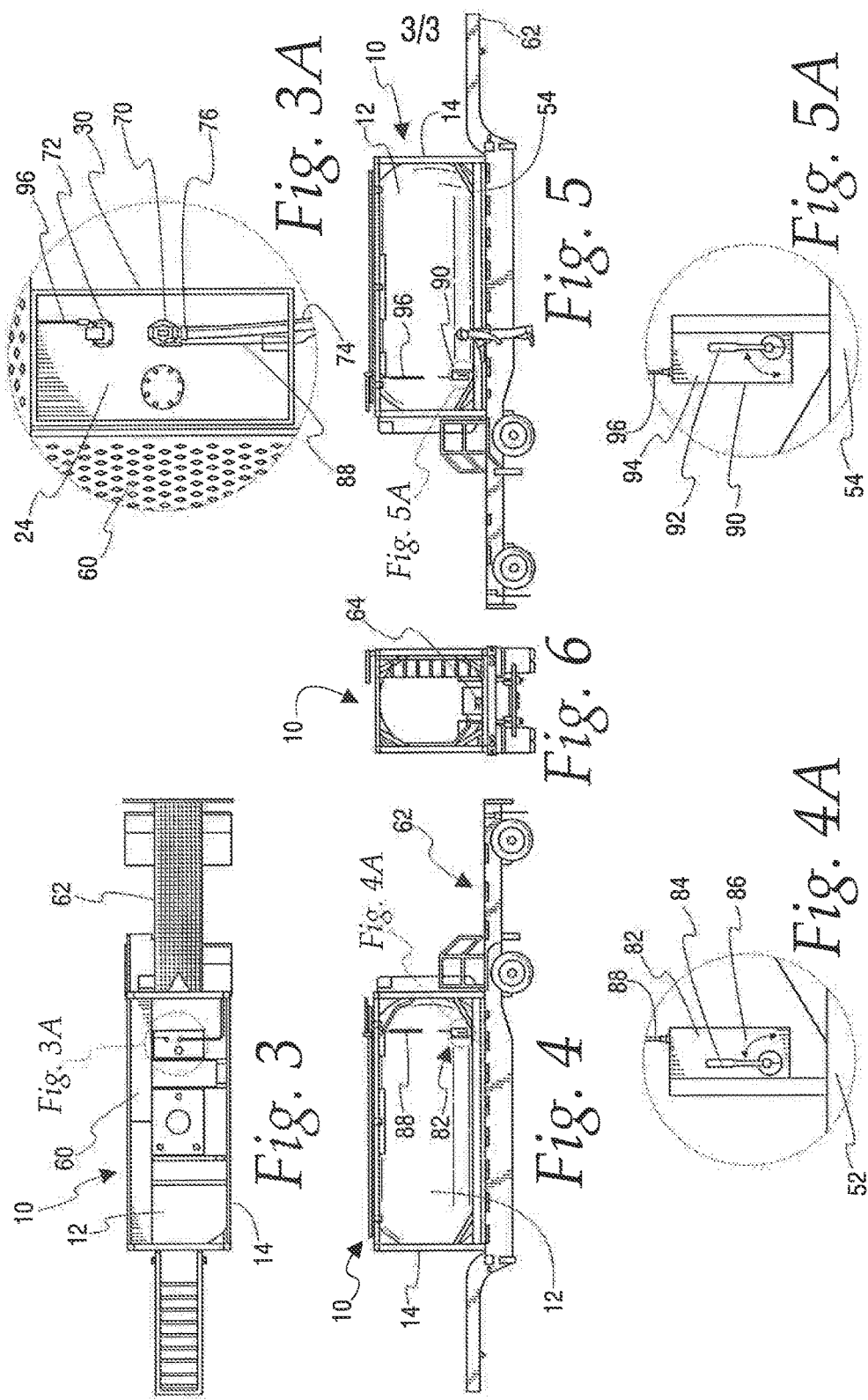

REMOTE OPERATED VALVES FOR ISO CONTAINERS

BACKGROUND OF THE INVENTION

Field of the Invention

This application relates to tank containers for bulk storage of liquid materials and, more particularly, to remote operated valves for such a tank container.

Background Art

Bulk packaging containers have found widespread use for storage and shipment of bulk goods. The bulk packaging containers assume many different forms. Among these forms are tank containers which are built to ISO standards (International Organization for Standardization). A tank container built to ISO standards is suitable for different modes of transportation. Both hazardous and non-hazardous products can be transported in ISO tank containers.

The tank container has a vessel of stainless steel in the middle of a steel frame. The frame is made according to ISO standards and is about 20 feet long, 8 feet wide, and 8 feet high. The contents of the tank range from about 7,000 to 10,000 gallons.

A conventional ISO tank container has an outlet valve proximate a bottom of the vessel, a fill valve at a top of the vessel, and a vent valve at the top of the vessel. To fill the storage vessel the operator must climb atop the container and attach the fill hose to the fill valve and open the valve and also open the vent valve to prevent pressure from building up. When unloading the vessel the operator attaches the hose to the outlet valve and then climbs to the top of the container to open the vent valve while discharging to prevent it from creating a vacuum that could damage the tank. Both of these operations require that the operator climb to the top of the container.

The present application is directed to improvements in tank containers for bulk storage of liquid materials.

SUMMARY OF THE INVENTION

As described herein, a tank container for bulk storage of liquid materials is provided with remote operated valves which allows the operator to open and close the valves while being on the ground without having to climb to the top of the container.

Broadly, disclosed herein is a tank container for bulk storage of liquid materials with remote operated valves. The tank container comprises a storage vessel for bulk storage of liquid materials and having a height of about eight feet. The storage vessel includes an outlet valve proximate a bottom of the vessel, a fill valve at a top of the vessel, and a vent valve at the top of the vessel. A parallelepiped frame surrounds and is secured to the storage vessel for stacking and transporting of the tank container. A fill line includes an outlet connected to the fill valve and extending downwardly within the frame and an inlet proximate the bottom of the frame. A fill valve actuator is mounted proximate the bottom of the storage vessel mechanically linked with the fill valve for operating the fill valve remote from the top of the storage vessel. A vent valve actuator is mounted proximate the bottom of the storage vessel mechanically linked with the vent valve for operating the vent valve remote from the top of the storage vessel.

In one aspect, the tank container comprises an ISO compliant tank container.

It is a feature that the fill valve actuator is mechanically linked to the fill valve with a control cable and the vent valve actuator is mechanically linked to the vent valve with a control cable.

It is another feature that the fill valve actuator and vent valve actuator comprise lever actuators.

It is another feature that the fill valve actuator pushes and pulls a control cable to selectively operate the fill valve, and that the vent valve actuator pushes and pulls a control cable to selectively operate the vent valve.

It is a further feature that the tank container fill line is fixedly mounted to the frame and does not protrude outside of the frame.

It is an additional feature that the fill valve actuator and the vent valve actuator are mounted to the bottom of the frame so that they do not protrude outside of the frame. The fill valve actuator and the vent valve actuator may be mounted to opposite sides of the frame.

Further features and advantages will be readily apparent from the specification and from the drawings.

BRIEF DESCRIPTION OF THE DRAWINGS

FIG. 3 is a plan view of the ISO tank container and trailer of FIG. 2;

FIG. 3A is a detail view taken from FIG. 3;

FIG. 4 is a side view of the ISO tank container and trailer of FIG. 2;

FIG. 4A is a detail view taken from FIG. 4;

FIG. 5 is a left side elevation view of the ISO tank container and trailer of FIG. 2;

FIG. 5A is a detail view taken from FIG. 5;

FIG. 6 is a rear elevation view of the ISO tank container and trailer of FIG. 2.

DETAILED DESCRIPTION OF THE PREFERRED EMBODIMENT

This application is directed to tank containers for bulk storage of liquid materials, such as ISO compliant tank containers. As described herein, the tank containers are provided with remote controlled valves which allow an operator to open and close a vent valve and a fill valve from the ground without having to climb on to the top of the tank container. Moreover, the valves are installed within the frame dimensions to maintain the container as ISO certified.

Figure 1:
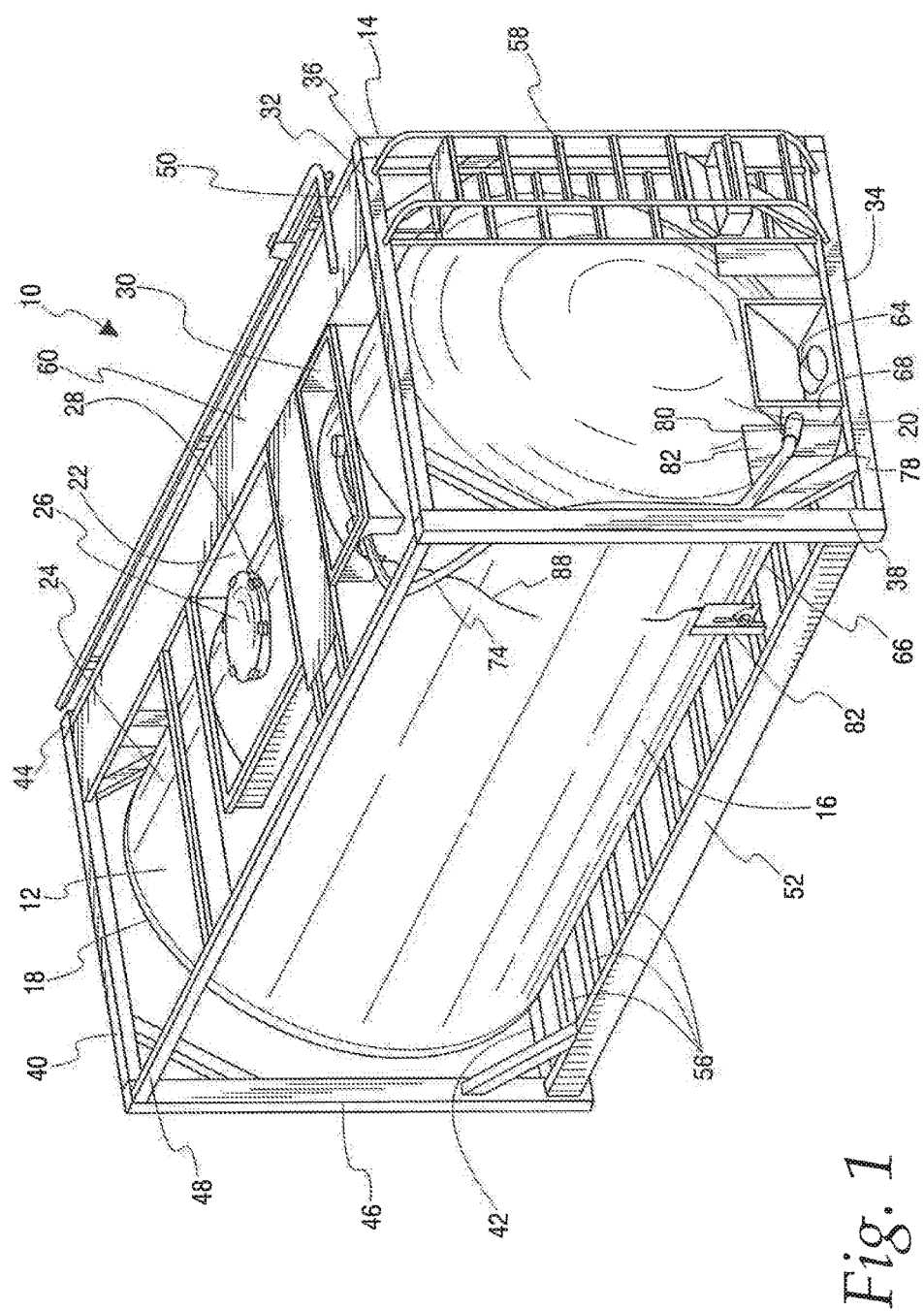
FIG. 1 is a perspective view of an ISO tank container in accordance with the invention.

Referring initially to FIG. 1, an ISO tank container 10 is illustrated. The tank container 10 comprises a storage vessel 12 surrounded by and supported by a frame 14.

In the illustrated embodiment, the storage vessel 12 may be of stainless steel construction and comprises a generally cylindrical outer wall 16 closed at opposite ends by a hemispherical front end wall 18 and a hemispherical rear end wall 20. A middle spill box 22 is secured to a top 24 of the vessel 12. A manhole lid 26 covers an opening 28 in the top 24 of the storage vessel 12 within the middle spill box 22. A rear spill box 30 is on the top of the storage vessel 12 proximate the rear end wall 20. The rear spill box 30 surrounds remote control valves as discussed below.

The frame 14 is of carbon steel construction and includes a rear top rail 32, a rear bottom rail 34, and opposite rear side rails 36 and 38 secured to settle as by welding in a generally square configuration of about 8 feet high and 8 feet wide. The frame 14 similarly includes a front top rail 40, a front bottom rail 42, and opposite front side rails 44 and 46 also secured in a square configuration. The front and rear ends of the frame 14 are connected by opposite top side rails 48 and 50 and opposite bottom side rails 52 and 54, see also FIG. 5, in a parallelepiped configuration. A plurality of slats 56 extends between the bottom side rails 52 and 54 to support the storage vessel 12. A ladder 58 is connected to the rear top and bottom rails 32 and 34. A grating 60 is provided on the top of the frame 14 for allowing an operator access to the top 24 of the storage vessel 12.

In the illustrated embodiment, the tank container 10 is ISO compliant with the frame and vessel dimensions generally being as described above. This basic structure of the ISO tank container 10 is well known.

Figure 2:
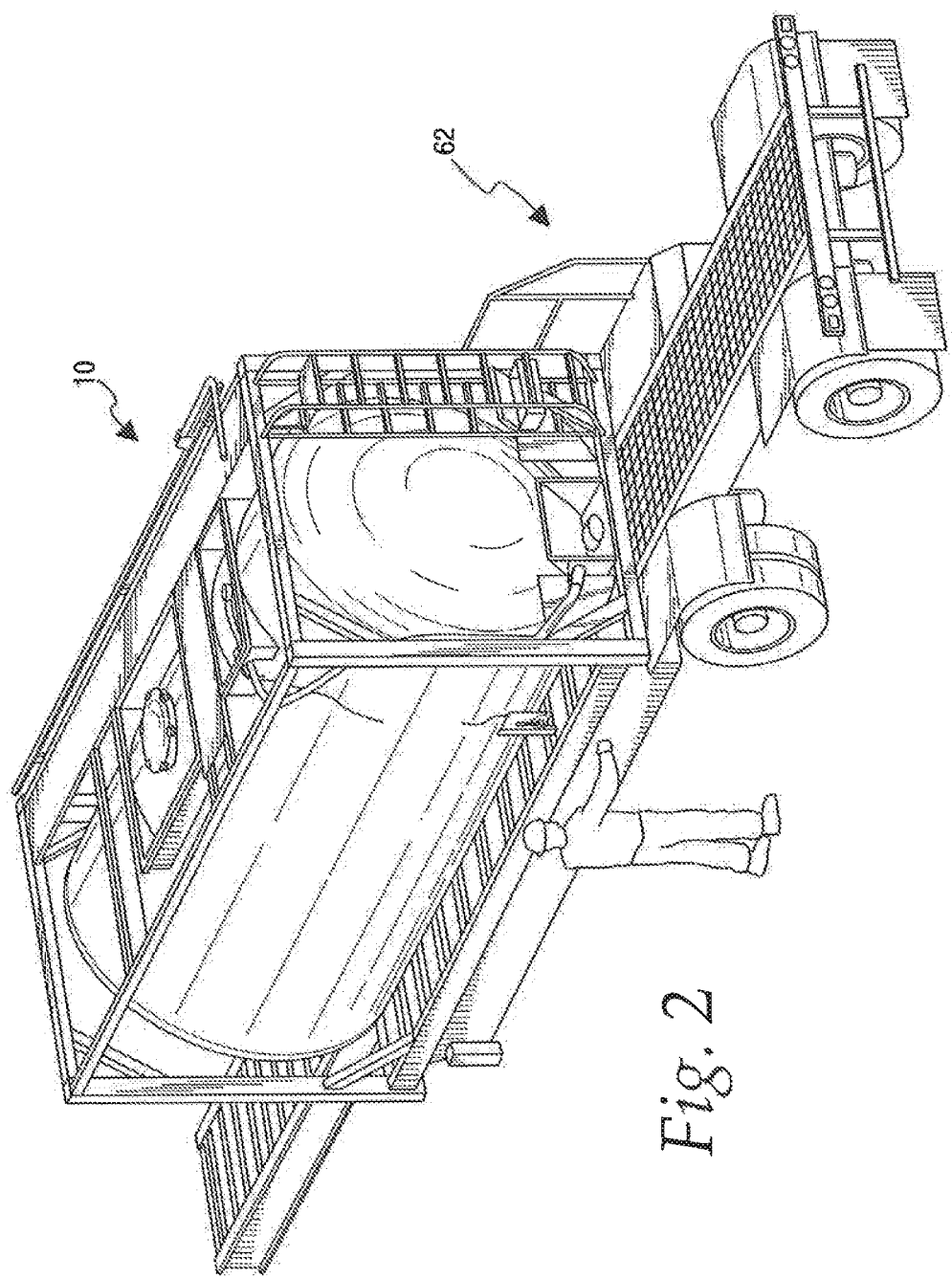
FIG. 2 is a perspective view of an ISO tank container of FIG. 1 mounted to a trailer.

The ISO tank container frame 14 enables the tank container 10 to be stacked with other tank containers. Additionally, the tank container 10 can be transported on a trailer 62, as shown in FIG. 2. The trailer 62 can be of any conventional design adapted to support the tank container 10, as will be apparent. Similarly, the remote operated valves described herein are not limited to use with the described configuration.

Referring to FIGS. 3-6, including detailed FIGS. 3A, 4A, and 5A, the remote operated valve structure for the ISO tank container 10 will be described.

A conventional outlet valve 64 is provided proximate a bottom 66 of the rear end wall 20 of the storage vessel 12. The outlet valve 64 is surrounded by a canopy 68 secured to the frame rear bottom rail 34. The outlet valve 64 is adapted to connect to a hose (not shown) in a conventional manner to unload the liquid material from the storage vessel 12, as is well known.

Referring to FIG. 3A, a fill valve 70 is located in the storage vessel top wall 24 within the rear spill box 30. The fill valve 70 may comprise, for example, a 1 by 1.5 inch BSP airline ball valve assembly. Proximate the fill valve 70 is a vent valve 72. The vent valve may be, for example, a 1 by 2.5 inch BAP safety relief valve assembly. As will be apparent, other types of valve assemblies could also be used. Each of these valves is mechanically actuated using a remote control operator handle.

A fill line 74 includes an outlet end 76 and an opposite inlet end 78. The outlet end 76 is connected to the fill valve 70. The inlet end 78 is connected to a manually operated fill valve 80 fixedly secured to a plate 82 secured to the frame rear bottom rail 34, see FIG. 1. The fill line 74 is routed so that it is completely within the boundaries of the frame 14 to maintain ISO compliance.

A fill valve actuator 82 is secured to the frame bottom side rail 52, see FIG. 4A. The fill valve actuator 82 includes a lever 84 rotationally mounted to a plate 86 or an automated actuator. A control cable 88, such as a conventional throttle cable, mechanically links the fill valve actuator 82 with the operator handle of the fill valve 70 to actuate the same. As is known a throttle type cable includes an outer sleeve which is fixedly mounted, and a steel cable movably mounted within the outer sleeve. The inner steel cable of the control cable 88 is connected at one end to the lever 84 and at its opposite end to the fill valve operator handle so that rotation of the lever 84 causes a pulling and pushing action of the internal steel cable to open and close the fill valve 70. A portion of the control cable 88 is concealed within a cable guide in the vessel side wall 16, as shown in FIG. 1, to maintain the control cable 88 in the boundaries of the frame 14 to maintain ISO compliance.

A vent valve actuator 90 is secured to the frame bottom side rail 54, see FIG. 5A. The vent valve actuator 90 includes a lever 92 rotationally mounted to a plate 94 for operating a control cable 96, similar to the control cable 88, or an automated actuator. The control cable 96 is mechanically linked to the operator handle of the vent valve 72, see FIG. 3A. Rotating the handle 92 downwardly pulls the inner steel cable of the control cable 96 to open the valve 72. Likewise, raising the handle 92 to the position shown in FIG. 5A is operative to close the vent valve 72.

Thus, the remote control feature allows an operator to open and close the vent valve 72 and the fill valve 70 from the ground, without having to climb onto the top grating 60. This improves safety and efficiency in the loading facility and in the field.

When filling liquid material into the storage vessel 12 the operator would attach a hose (not shown) to the fill line manual valve 80. The operator would then activate the remote fill valve 70, using the fill valve actuator 82, see FIG. 4, to open the fill valve 70 on the top of the storage vessel 12. The operator would then go to the opposite side and activate the vent remote valve 72 using the vent valve actuator 90, see FIG. 5, to vent the storage vessel 12 while it is being filled to prevent pressure from being built up and damaging the storage vessel 12. This keeps the operator safely on the ground.

When unloading the vessel 12, the operator would attach the hose (not shown) to the outlet valve 64 and then activate the remote vent valve 72 using the actuator 90 to vent the vessel 12 while discharging to prevent it from creating a vacuum that could damage the vessel 12. This is completed while the operator is safely on the ground and does not have to climb onto the top grating 60.

As described, the fill line 74 is piped to the bottom of the vessel 12 within the dimensions of the frame 14 and the control cables 88 and 96 are within the boundaries of the frame 14 to maintain ISO certification.

Thus, a tank container 10 for bulk storage of goods, such as an ISO tank container, is provided with remote operated valve control, which allows the tank to be loaded and unloaded by an operator from the ground. As will be apparent, the remote controlled valves 70 and 72 could be used with tank containers of different dimensions and shapes and tank containers that are not ISO compliant.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A tank container for bulk storage of liquid materials with remote operated valve control, comprising:
   a storage vessel for bulk storage of liquid materials and having a height of about eight feet, the storage vessel including an outlet valve proximate a bottom of the vessel, a fill valve at a top of the vessel and a vent valve at the top of the vessel;

a parallelepiped frame surrounding and secured to the storage vessel for stacking and transporting of the tank container;

a fill line including an outlet connected to the fill valve and extending downwardly within the frame and an inlet proximate a bottom of the frame;

a fill valve actuator mounted proximate the bottom of the storage vessel mechanically linked with the fill valve for operating the fill valve remote from the top of the storage vessel; and a vent valve actuator mounted proximate the bottom of the storage vessel mechanically linked with the vent valve for operating the vent valve remote from the top of the storage vessel.

2. The tank container of claim 1 wherein the fill valve actuator is mechanically linked to the fill valve with a control cable.

3. The tank container of claim 1 wherein the vent valve actuator is mechanically linked to the vent valve with a control cable.

4. The tank container of claim 1 wherein the fill valve actuator comprises a lever actuator.

5. The tank container of claim 1 wherein the vent valve actuator comprises a lever actuator.

6. The tank container of claim 1 wherein the fill valve actuator pushes and pulls a throttle cable to selectively operate the fill valve.

7. The tank container of claim 1 wherein the vent valve actuator pushes and pulls a throttle cable to selectively operate the vent valve.

8. The tank container of claim 1 wherein the fill line is fixedly mounted to the frame and does not protrude outside of the frame.

9. The tank container of claim 1 wherein the fill valve actuator and the vent valve actuator are mounted to a bottom of the frame.

10. The tank container of claim 9 wherein the fill valve actuator and the vent valve actuator are mounted to opposite sides of the frame.

11. An ISO compliant tank container for bulk storage of liquid materials with remote operated valve control, comprising:

a storage vessel for bulk storage of liquid materials and having a height of about eight feet, the storage vessel including an outlet valve proximate a bottom of the vessel, a fill valve at a top of the vessel and a vent valve at the top of the vessel;

a parallelepiped frame surrounding and secured to the storage vessel for stacking and transporting of the tank container;

a fill line including an outlet connected to the fill valve and extending downwardly within the frame and an inlet proximate a bottom of the frame;

a fill valve actuator mounted proximate the bottom of the storage vessel mechanically linked with the fill valve for operating the fill valve remote from the top of the storage vessel; and a vent valve actuator mounted proximate the bottom of the storage vessel mechanically linked with the vent valve for operating the vent valve remote from the top of the storage vessel, the storage vessel, the fill line, the valves and the actuators all contained within the frame.

12. The ISO compliant tank container of claim 11 wherein the fill valve actuator is mechanically linked to the fill valve with a control cable.

13. The ISO compliant tank container of claim 11 wherein the vent valve actuator is mechanically linked to the vent valve with a control cable.

14. The ISO compliant tank container of claim 11 wherein the fill valve actuator comprises a lever actuator.

15. The ISO compliant tank container of claim 11 wherein the vent valve actuator comprises a lever actuator.

16. The ISO compliant tank container of claim 11 wherein the fill valve actuator pushes and pulls a throttle cable to selectively operate the fill valve.

17. The ISO compliant tank container of claim 11 wherein the vent valve actuator pushes and pulls a throttle cable to selectively operate the vent valve.

18. The ISO compliant tank container of claim 11 wherein the fill line is fixedly mounted to the frame and does not protrude outside of the frame.

19. The ISO compliant tank container of claim 11 wherein the fill valve actuator and the vent valve actuator are mounted to a bottom of the frame.

20. The ISO compliant tank container of claim 19 wherein the fill valve actuator and the vent valve actuator are mounted to opposite sides of the frame.

* * * * *